United States Patent
Jar et al.

(10) Patent No.: US 11,329,733 B1
(45) Date of Patent: May 10, 2022

(54) ON AIR TESTING METHOD AND APPARATUS FOR RECEIVER ANTENNAE OF A TETRA BASE STATION

(71) Applicant: Saudi Arabian Oil Company, Dhahran (SA)

(72) Inventors: Mustafa A Jar, Dhahran (SA); Yousif M Muhaimeed, Dammam (SA); Mohammed S. Almehmadi, Dammam (SA); Naif R. Al-Mutairi, Dammam (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 17/080,231

(22) Filed: Oct. 26, 2020

(51) Int. Cl.
*H04B 17/00* (2015.01)
*H04B 17/15* (2015.01)
*H04B 17/318* (2015.01)
*H04W 88/08* (2009.01)

(52) U.S. Cl.
CPC ........... *H04B 17/15* (2015.01); *H04B 17/318* (2015.01); *H04W 88/08* (2013.01)

(58) Field of Classification Search
CPC ...... H04B 17/15; H04B 17/318; H04W 88/08
USPC ........................................ 375/224; 455/115.3
See application file for complete search history.

(56) References Cited

U.S. PATENT DOCUMENTS

| | | | |
|---|---|---|---|
| 9,363,784 B1 * | 6/2016 | Friday | H04W 4/029 |
| 2007/0123274 A1 | 5/2007 | Jakobsen | |
| 2007/0232302 A1 | 10/2007 | Aminov et al. | |
| 2015/0050884 A1 | 2/2015 | Phang et al. | |
| 2016/0323754 A1 * | 11/2016 | Friday | H04W 4/021 |
| 2017/0170917 A1 | 6/2017 | Barsumian et al. | |
| 2017/0171833 A1 | 6/2017 | Vamaraju et al. | |
| 2019/0075549 A1 | 3/2019 | Yucek et al. | |
| 2019/0306662 A1 | 10/2019 | Poola et al. | |
| 2020/0059770 A1 * | 2/2020 | Smith | H04W 4/023 |
| 2021/0155275 A1 * | 5/2021 | Fisher | B61L 23/06 |

* cited by examiner

*Primary Examiner* — Don N Vo
(74) *Attorney, Agent, or Firm* — Leason Ellis LLP

(57) ABSTRACT

A system and method are configured to check the health of a TETRA-based communication system without interrupting or degrading the operation of the TETRA base station. The health is checked by at least measuring an uplink RSSI of the TETRA base station and determining a transmitted power level and a location of a transmitter. The measured RSSI is used to determine a strongest RSSI and to obtain the transmitted power level and location of a transmitter corresponding to the strongest RSSI.

20 Claims, 4 Drawing Sheets

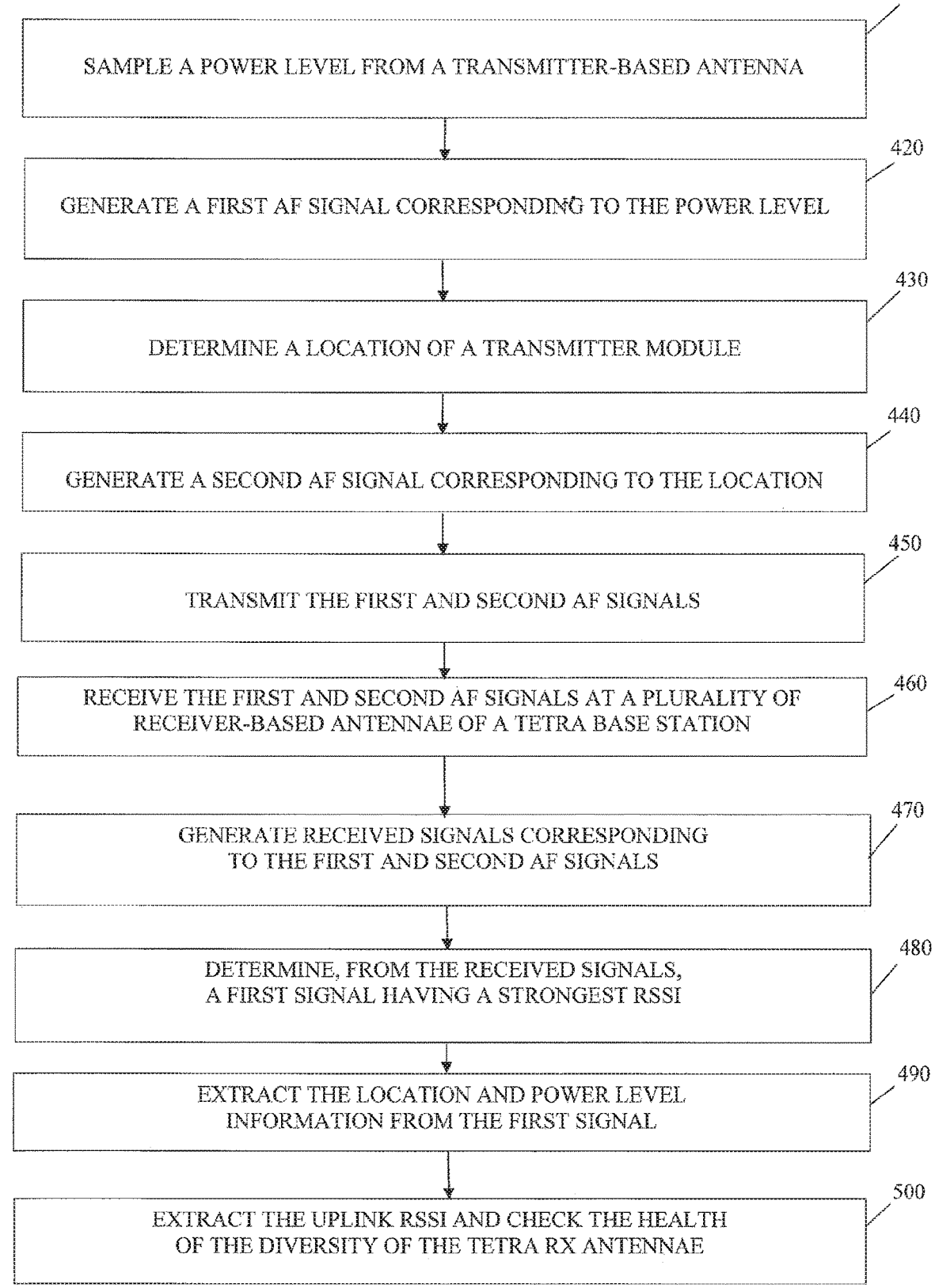

ON AIR TESTING METHOD AND APPARATUS FOR RECEIVER ANTENNAE OF A TETRA BASE STATION

FIELD OF THE DISCLOSURE

The present disclosure relates generally to Terrestrial Trunked Radio (TETRA) based communications, and, more particularly, to a system and method for checking the health of a TETRA-based communication system using a base station without interrupting or degrading the operation of the base station.

BACKGROUND OF THE DISCLOSURE

In the prior art, a TETRA-based communication system uses a base station with multiple antennae. To check the health and operation of the base station, the practice in the prior art requires a technician to disconnect each feeder manually and test the feeders individually, which consumes a great deal of time and effort. In addition, the service provided by the base station to a geographic area is degraded during such manual testing. Moreover, there is no specific tool in the prior art to measure the uplink RSSI of the TETRA base station. Knowledge of an uplink coverage of a base station is critical in enhancing the coverage of the base station in a designated area.

SUMMARY OF THE DISCLOSURE

According to an embodiment consistent with the present disclosure, a system and method check the health of a TETRA-based communication system without interrupting or degrading the operation of the TETRA base station. The health is checked by at least measuring an uplink RSSI of the TETRA base station.

In an embodiment, a communication system comprises a transmitter module, a plurality of antennae, and a receiver module. The transmitter module has a first processor and a first memory storing first code, executed by the first processor. The transmitter module is configured to transmit location information and power level information. The receiver module has a second processor and a second memory storing second code, executed by the second processor. The receiver module is configured to receive the location information and power level information as received signals at the plurality of antennae. The code executed in the second processor of the receiver module determines, from the received signals, a first signal having a strongest received signal strength indicator (RSSI) and extracts the location information and power level information from the first signal.

The transmitter module includes a location determining module configured by the code executing in the first processor to determine the location of the transmitter module as the location information. The location determining module includes a Global Positioning System (GPS) module. The receiver module also comprises a TETRA base station, with the plurality of antennae included in the TETRA base station. The receiver module also comprises a plurality of microcontrollers, each connected to a respective one of the plurality of antennae and each configured by code executing therein to receive a respective received signal. Each microcontroller generates a respective received signal strength indicator (RSSI) corresponding to the received signal received by the respective microcontroller.

The transmitting module transmits the location information and the power level information as respective audio frequency (AF) signals. The receiver module also comprises a decoder, and a microcontroller configured by code executing therein to switch the first signal to the decoder to extract the location information and power level information.

In another embodiment, a communication system comprises a transmitter module and a receiver module, with the transmitter module having a transmitter-based antenna, a first processor configured by first code executing therein to sample a power level from the transmitter-based antenna and to generate a corresponding first AF signal, a first memory storing at least the first code executed by the first processor, a location determining module configured to determine the location of the transmitter module and to generate a corresponding second AF signal, and a radio configured to transmit the first and second AF signals.

The receiver module has a second processor, a second memory storing second code, executed by the second processor; and a TETRA base station having a plurality of receiver-based antennae which is configured to receive the first and second AF signals, and to generate corresponding received signals. The second code executing in the second processor determines, from the received signals, a first signal having a strongest RSSI, and extracts the location and power level information from the first signal. The location determining module includes a GPS module. The receiver module also comprises a plurality of microcontrollers, each connected to a respective receiver-based antenna and each configured by code executing therein to receive a respective received signal and to generate a respective RSSI corresponding to the received signal received by the respective microcontroller.

The receiver module also comprises a decoder, and the second processor is configured by code executing therein to switch the first signal to the decoder to extract the location and power level information. The receiver module further comprises a switch configured to switch the first signal from a corresponding microcontroller having the strongest RSSI to the decoder. The communication system also comprises a third memory configured to store the location information and the power level information.

In a further embodiment, a method comprises sampling a power level from a transmitter-based antenna, generating a first AF signal corresponding to the power level, determining a location of a transmitter module, generating a second AF signal corresponding to the location, transmitting the first and second AF signals, receiving the first and second AF signals at a plurality of receiver-based antennae of a TETRA base station, generating received signals corresponding to the first and second AF signals, determining from the received signals a first signal having a strongest RSSI, and extracting the location and power level information from the first signal. The method determines the location by using a GPS module. The method also comprises providing a plurality of slave microcontrollers each connected to a respective receiver-based antenna, receiving a respective received signal at each slave microcontroller, and generating a respective RSSI corresponding to the received signal received by the respective slave microcontroller. The method also comprises storing the extracted location and the extracted power level information. The method further comprises switching the first signal to a decoder and extracting the location and power level information from the first signal using the decoder. The switching includes switching a first signal from a corresponding slave microcontroller having the strongest RSSI to the decoder. The method further comprises transmitting the RSSI from each slave microcontroller to a master microcontroller.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

BRIEF DESCRIPTION OF THE DRAWINGS

FIG. 4 is a flowchart of a method of operation of the communication system, according to the embodiment.

It is noted that the drawings are schematic and are not to scale.

DETAILED DESCRIPTION OF CERTAIN EMBODIMENTS OF THE DISCLOSURE

Example embodiments consistent with the teachings included in the present disclosure are directed to a system and method which check the health of a TETRA-based communication system without interrupting or degrading the operation of the TETRA base station. The health is checked by at least measuring an uplink RSSI of the TETRA base station.

Figure 1:
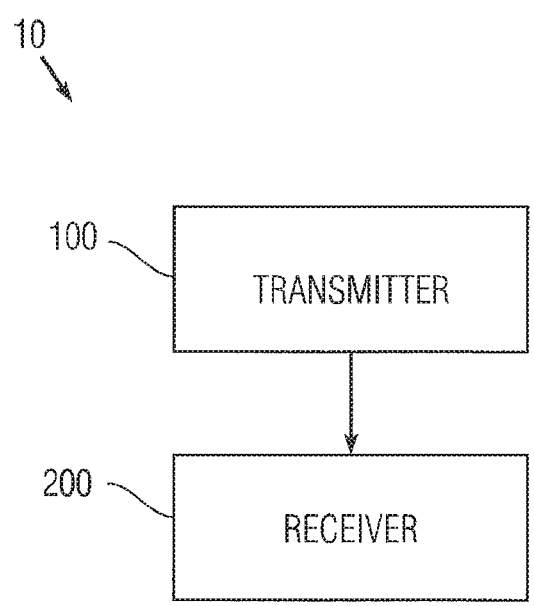
FIG. 1 is a schematic diagram of the overall arrangement of a communication system.
Figure 2:
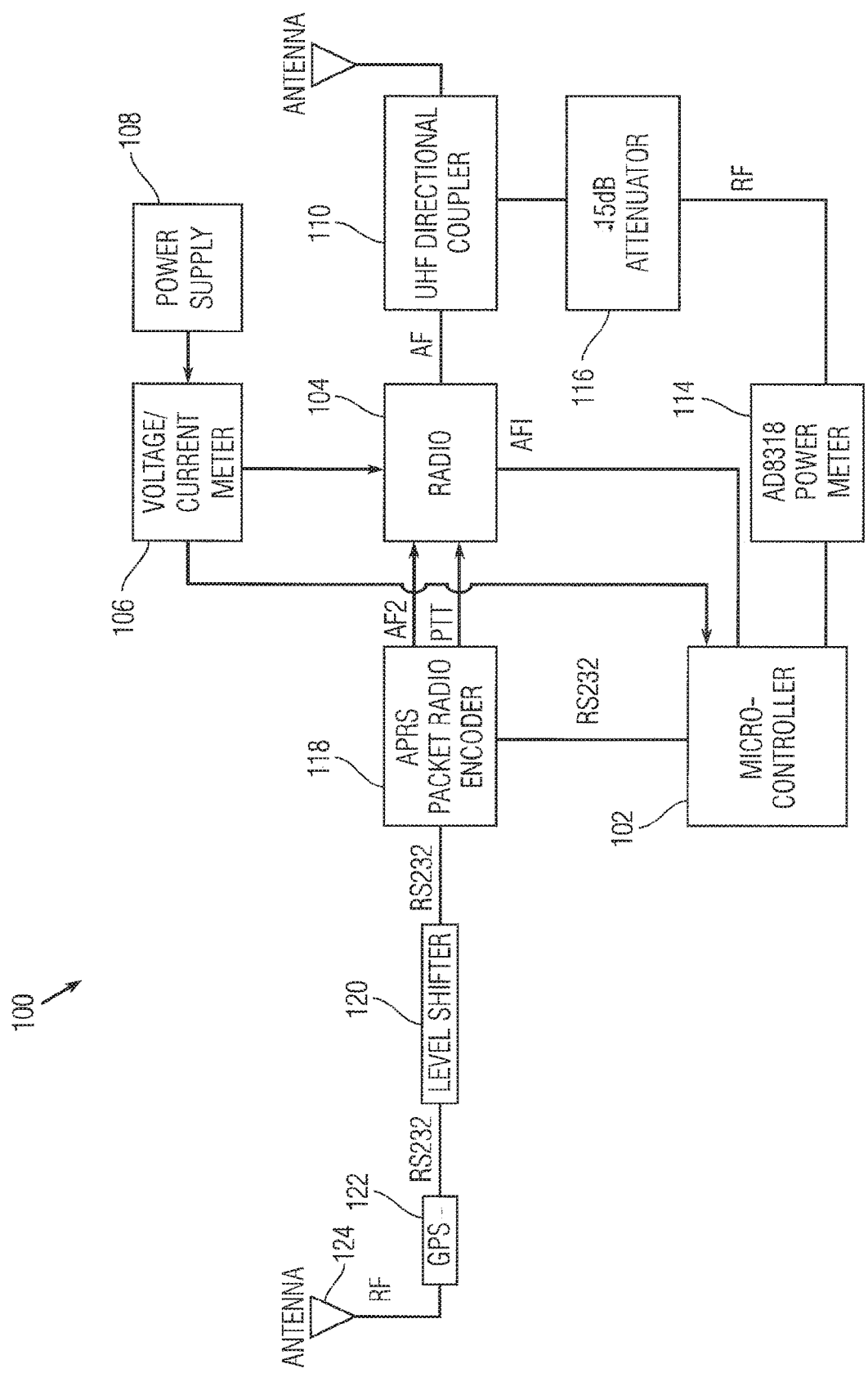
FIG. 2 is a schematic diagram of a transmitter module, according to an embodiment.
Figure 3:
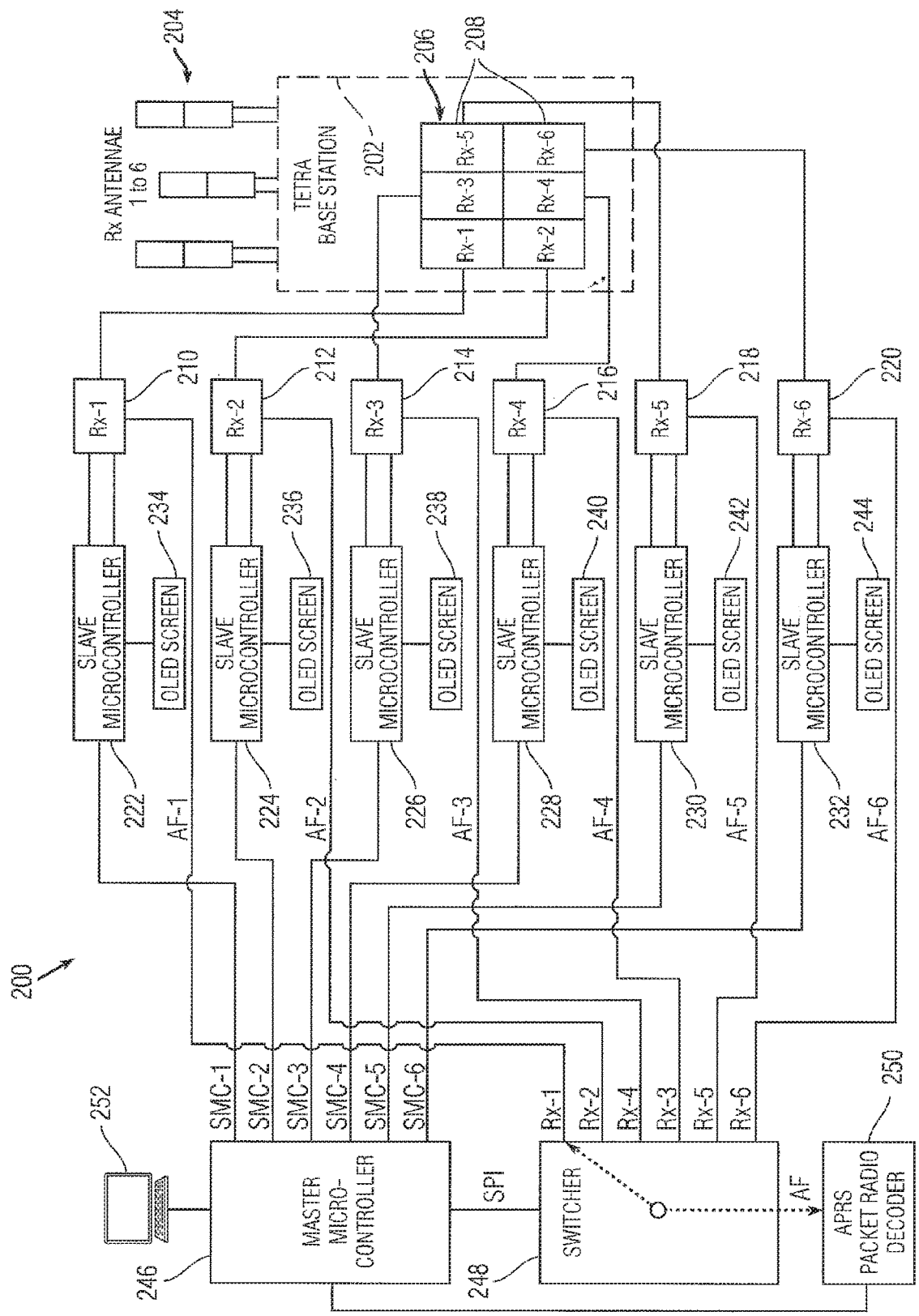
FIG. 3 is a schematic diagram of a receiver module, according to the embodiment.

As shown in FIG. 1, the TETRA-based communication system 10 includes a transmitter 100 and a receiver 200. In an example embodiment, the transmitter 100 is shown in FIG. 2, and the receiver 200 is shown in FIG. 3. Referring to FIG. 2, the transmitter 100 includes a microcontroller 102 and a radio 104. The radio 104 can be an analog radio. Each of the microcontroller 102 and the radio 104 is connected to a voltage/current meter 106. The voltage/current meter 106 supplies power from a power supply 108. The power supply 108 can be a 12 VDC power supply. The microcontroller 102 is connected to the radio 104. The radio 104 is connected to a directional coupler 110. The directional coupler 110 can be a UHF directional coupler. The directional coupler 110 is connected to a first antenna 111. The microcontroller 102 is connected to a power meter 114, which is connected to an attenuator 116. The attenuator 116 is connected, in turn, to the directional coupler 110. In addition, in the illustrated embodiment, each of the microcontroller 102 and the radio 104 is connected to an automatic packet reporting system (APRS)-based packet radio encoder 118. The APRS 118 is connected to a level shifter 120. The level shifter 120 can be a 3.3V-to-5.0V voltage level shifter. The level shifter 120 is connected to a location system 122, which can be a Global Positioning System (GPS). Alternatively, the location system 122 can be embodied as GLONASS, GALILEO, BEIDOU, and/or any known location system. The location system 122 is connected to a second antenna 124.

In operation, the microcontroller 102 is configured by code executing therein to perform certain functions described next, including sampling and controlling functions. As such, the microcontroller samples the transmitted power through the directional coupler 110. From such sampling, the microcontroller 102 causes the generation of a first AF signal, labeled AF1, which encodes the sampled transmitted power. The microcontroller 102 also provides the transmitted power to the APRS encoder 118 via suitable connections to the APRS encoder. The microcontroller 102 controls the transmitted power level from the radio 104. In addition, the location system 122 generates location information specifying the location of the transmitter 100. The location information is provided to the APRS encoder 118. The APRS encoder 118 generates a second AF signal, labeled AF2, which encodes the location information of the transmitter 100. The microcontroller 102 then controls the APRS encoder 118 to cause the radio 104 to broadcast the two AF signals AF1, AF2. Accordingly, the transmitter 100 broadcasts the first AF signal AF1 which encodes the transmitted power level and broadcasts the second AF signal AF2 which encodes the location information.

Referring to FIG. 3, the receiver 200 includes the TETRA base station 202 having a plurality of receiver (RX) antennae 204. In an embodiment, there are six receiving antennae which are individually connected to a dual received multicoupler (DRMC) 206 having a plurality of DRMC ports 208. Each of the DRMC ports 208 is connected to a respective embedded transceiver module 210, 212, 214, 216, 218, 220. Each of the transceiver modules 210-220, labeled Rx-1, Rx-2, Rx-3, Rx-4, Rx-5, and Rx-6, generates respective AF signals which encode the transmitted power level and the location information. The AF signals are distributed to respective slave microcontrollers 222, 224, 226, 228, 230, 232. Each slave microcontroller has a processor and executes code which configures the respective processor to perform the functions described next.

Each slave microcontroller 222-232 can optionally be connected to a respective output device 234, 236, 238, 240, 242, 244 to output a message to a technician indicating, for example, the received signal strength indicator (RSSI) values of the signals received by the respective antennae 204. For example, any of the output devices 234-244 can be a printer. In another embodiment, any of the output devices 234-244 can be a display screen, such as an organic light emitting diode (OLED). Each of the slave microcontrollers 222-232 is programmed to send a signal to its corresponding OLED to display the RSSI results on the OLED.

Each slave microcontroller 222-232 outputs its respective RSSI value, labeled SMC-1 to SMC-6, to a master microcontroller 246. The master microcontroller 246 determines which RSSI value is the strongest and determines from which slave microcontroller 222-232 that has the strongest RSSI value. Such determinations can be as a result of code executing in the master microcontroller 246 processes the signals. The processing can include sorting in signal-strength order to identify the strongest, a comparison of one signal to a next and continuing that comparison until the strongest in each comparison is retained until all signals have been compared, or otherwise so as to identify the strongest signal using a programmed processor.

Each of the transceiver modules 210-220 also distributes the respective AF signals, labeled AF-1, AF-2, AF-3, AF-4, AF-5, AF-6, to a switcher 248. The switcher 248 can be an audio switcher. Based on the strongest RSSI value, the master microcontroller 246 sends a command (SPI) to the switcher 248. In response to the command, the switcher 248 passes the AF signal from the slave microcontroller, which has the strongest RSSI value, to an APRS decoder 250. The AF signal includes the transmitted power level and the location information from the transmitter 100. The APRS decoder 250 sends the transmitted power level and the location information to a memory to be stored and recorded. The memory can be included in a computing device 252, such as a personal computer (PC). The information, including the power level and the location information, is sent to the master microcontroller 246. The master microcontroller can be interfaced with the PC 252 to collect and analyze the data.

The recordation of such transmitted power levels and location information from transmitters, such as the transmitter 100, can aid a technician to determine the health of the communication system 10. For example, the received and recorded data is available for further processing to identify the reception performance health as well as the uplink RSSI in a targeted area. The storage in the memory can be the storage in the PC 252. The PC storage can be large enough to accommodate the expected data. Certain predetermined criteria and tests can then be used to analyze the extracted data and to determine the health of the diversity of the TETRA RX antennae, using the PC 252.

Accordingly, by automatically processing the AF signals encoding the transmitted power levels and the location information from transmitters 100, the communication system 10 allows technicians to monitor the health of the receiver 200 without interrupting or degrading the operation of the receiver 200.

Referring to FIG. 4, a method 400 of operation of the communication system 10 includes sampling a power level from a transmitter-based antenna 112 in step 410, using the directional coupler 110 in conjunction with the power meter 114 of a transmitter 100, shown in FIG. 2. Such sampled power levels are obtained by the microcontroller 102. The method 400 then generates a first AF signal, labeled AF1, corresponding to the power level in step 420, using the microcontroller 102.

The method 400 then determines a location of the transmitter 100 using a location system 122 in step 430. The location system 122 can be a GPS system. The method 400 generates a second AF signal, labeled AF2, corresponding to the location, in step 440. The method 400 then transmits the first and second AF signals, as an AF signal, in step 450.

At the receiver 200, shown in FIG. 3, the method receives the first and second AF signals at a plurality of receiver-based (RX) antennae 204 of a TETRA base station 202, in step 460. The method then generates received signals corresponding to the first and second AF signals in step 470, using the transceiver modules 210-220. The method 400 then determines, from the received signals, a first signal having a strongest RSSI using the master microcontroller 246, in step 480, such as by using the programming mentioned above. The method 400 extracts the location and power level information from the first signal in step 490 using switcher 248. The method 400 then extracts the uplink RSSI and checks the health of the diversity of the TETRA RX antennae 204 in step 500, from the received transmitted power levels and the location information using the PC 252.

Portions of the methods described herein can be performed by software or firmware in machine readable form on a tangible (e.g., non-transitory) storage medium. For example, the software or firmware can be in the form of a computer program including computer program code adapted to cause the communication system to perform various actions described herein when the program is run on a computer or suitable hardware device, and where the computer program can be embodied on a computer readable medium. Examples of tangible storage media include computer storage devices having computer-readable media such as disks, thumb drives, flash memory, and the like, and do not include propagated signals. Propagated signals can be present in a tangible storage media. The software can be suitable for execution on a parallel processor or a serial processor such that various actions described herein can be carried out in any suitable order, or simultaneously.

It is to be further understood that like or similar numerals in the drawings represent like or similar elements through the several figures, and that not all components or steps described and illustrated with reference to the figures are required for all embodiments or arrangements.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third) is for distinction and not counting. For example, the use of "third" does not imply there is a corresponding "first" or "second." Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. A communication system, comprising:
    a transmitter module having a first processor and a first memory storing first code, executed by the first processor, and being configured to transmit location information and power level information;
    a plurality of antennae; and
    a receiver module having a second processor and a second memory storing second code, executed by the second processor, and being configured to receive the location information and power level information as received signals at the plurality of antennae,
wherein the code executed in the second processor of the receiver module determines, from among the received signals, a strongest signal having a strongest received signal strength indicator (RSSI), and extracts the location information and power level information from the strongest signal.

2. The communication system of claim 1, wherein the transmitter module includes a location determining module configured by the code executing in the first processor to determine the location of the transmitter module as the location information.

3. The communication system of claim 2, wherein the location determining module includes a Global Positioning System (GPS) module.

4. The communication system of claim 1, wherein the receiver module further comprises a Terrestrial Trunked Radio (TETRA) base station, with the plurality of antennae included in the TETRA base station.

5. The communication system of claim 1, wherein the receiver module further comprises a plurality of microcontrollers, each connected to a respective one of the plurality of antennae and each configured by code executing therein to receive a respective received signal and to generate a respective received signal strength indicator (RSSI) corresponding to the received signal received by the respective microcontroller.

6. The communication system of claim 1, wherein the transmitting module transmits the location information and the power level information as respective audio frequency (AF) signals.

7. The communication system of claim 1, wherein the receiver module further comprises:
a decoder; and
a microcontroller configured by code executing therein to switch the strongest signal to the decoder to extract the location information and power level information.

8. A communication system, comprising:
a transmitter module having:
a transmitter-based antenna;
a first processor configured by first code executing therein to sample a power level from the transmitter-based antenna and to generate a corresponding first audio frequency (AF) signal;
a first memory storing at least the first code executed by the first processor;
a location determining module configured to determine the location of the transmitter module and to generate a corresponding second AF signal; and
a radio configured to transmit the first and second AF signals; and
a receiver module having:
a second processor;
a second memory storing second code, executed by the second processor; and
a Terrestrial Trunked Radio (TETRA) base station having a plurality of receiver-based antennae which is configured to receive the first and second AF signals, and to generate corresponding received signals,
wherein the second code executing in the second processor determines, from among the received signals, a strongest signal having a strongest received signal strength indicator (RSSI) and extracts the location and power level information from the strongest signal.

9. The communication system of claim 8, wherein the location determining module includes a Global Positioning System (GPS) module.

10. The communication system of claim 8, wherein the receiver module further comprises a plurality of microcontrollers, each connected to a respective receiver-based antenna and each configured by code executing therein to receive a respective received signal and to generate a respective received signal strength indicator (RSSI) corresponding to the received signal received by the respective microcontroller.

11. The communication system of claim 8, wherein the receiver module further comprises:
a decoder, and
wherein the second processor is configured by code executing therein to switch the strongest signal to the decoder to extract the location and power level information.

12. The communication system of claim 11, wherein the receiver module further comprises:
a switch configured to switch the first signal from a corresponding microcontroller having the strongest RSSI to the decoder.

13. The communication system of claim 11, further comprising:
a third memory configured to store the location information and the power level information.

14. A method, comprising:
sampling a power level from a transmitter-based antenna;
generating a first audio frequency (AF) signal corresponding to the power level;
determining a location of a transmitter module;
generating a second AF signal corresponding to the location;
transmitting the first and second AF signals;
receiving the first and second AF signals at a plurality of receiver-based antennae of a Terrestrial Trunked Radio (TETRA) base station;
generating received signals corresponding to the first and second AF signals;
determining, from among the received signals, a strongest signal having a strongest received signal strength indicator (RSSI); and
extracting the location and power level information from the strongest signal.

15. The method of claim 14, wherein determining the location includes using a Global Positioning System (GPS) module.

16. The method of claim 14, further comprising:
providing a plurality of slave microcontrollers, each connected to a respective receiver-based antenna;
receiving a respective received signal at each slave microcontroller; and
generating a respective received signal strength indicator (RSSI) corresponding to the received signal received by the respective slave microcontroller.

17. The method of claim 16, further comprising:
storing the extracted location and the extracted power level information.

18. The method of claim 16, further comprising:
switching the strongest signal to a decoder; and
extracting the location and power level information from the strongest signal using the decoder.

19. The method of claim 17, wherein the switching includes:
  switching the strongest signal from a corresponding slave microcontroller having the strongest RSSI to the decoder.

20. The method of claim 17, further comprising:
  transmitting the RSSI from each slave microcontroller to a master microcontroller.

\* \* \* \* \*